United States Patent [19]

Larson et al.

[11] Patent Number: 4,802,534

[45] Date of Patent: Feb. 7, 1989

[54] METHOD AND DEVICE FOR MANIPULATING FERROFLUIDS FOR USE IN CEMENTING WELLS

[75] Inventors: David B. Larson; Erik B. Nelson, both of Broken Arrow, Okla.

[73] Assignee: Dowell Schlumberger Incorporated, Tulsa, Okla.

[21] Appl. No.: 92,938

[22] Filed: Sep. 4, 1987

Related U.S. Application Data

[63] Continuation-in-part of Ser. No. 798,527, Nov. 15, 1985, Pat. No. 4,691,774.

[51] Int. Cl.$^4$ .................. E21B 33/14; E21B 43/00
[52] U.S. Cl. .................... 166/381; 166/66.5; 166/285
[58] Field of Search ............. 166/66.5, 65.1, 292, 166/285, 381

[56] References Cited

U.S. PATENT DOCUMENTS

| | | |
|---|---|---|
| 2,279,262 | 4/1942 | Edwards . |
| 2,292,838 | 8/1942 | Jones . |
| 2,696,260 | 12/1954 | Fast ..................... 166/66.5 |
| 2,709,104 | 5/1955 | Gibbs ................... 166/66.5 X |
| 3,203,491 | 8/1965 | Turley .................. 166/66.5 X |
| 3,637,033 | 1/1972 | Mayall ................. 166/66.5 X |
| 4,124,075 | 11/1978 | Messenger . |
| 4,222,444 | 9/1980 | Hamilton . |
| 4,242,141 | 12/1980 | Rogov et al. . |
| 4,465,140 | 8/1984 | Hoehn, Jr. ............ 166/66.5 X |
| 4,579,173 | 4/1986 | Rogensweig et al. . |
| 4,691,774 | 9/1987 | Nelson ................. 166/291 |

FOREIGN PATENT DOCUMENTS

| | | | |
|---|---|---|---|
| 91377 | 10/1983 | European Pat. Off. . | |
| 845724 | 8/1939 | France . | |
| 56951k | 3/1980 | Japan . | |
| 294928 | 10/1971 | U.S.S.R. ................. | 166/292 |
| 641074 | 1/1979 | U.S.S.R. ................. | 166/292 |
| 127471d | 1/1983 | U.S.S.R. . | |
| 1121394 | 10/1984 | U.S.S.R. ................. | 166/292 |

Primary Examiner—George A. Suchfield
Attorney, Agent, or Firm—Stephen A. Littlefield

[57] ABSTRACT

A novel method and device for manipulating ferrofluids for use in cementing wells are disclosed. The cementitious fluids may comprise: (a) a hydraulic cement, (b) finely divided magnetic particles, (c) a binding agent or a surfactant, and (d) a liquid medium. The binding agent or surfactant is present in the compositions in an amount sufficient to render the compositions stable in a magnetic field. When used in cementing wells, the cementitious ferrofluids are implaced in the annulus separating a casing from the formation in a wellbore by conventional techniques and the slurry is subsequently subjected to an activating alternating magnetic field that causes movement of the flurry. The non-cementitious ferrofluids comprise: (a) finely divided magnetic particles, (b) stabilizing agent, and (c) a liquid medium. The movement of the slurry results in a "scrubbing" action against the surface of the casing and formation surfaces, and a mixing of the slurry which helps displace any residual drilling mud. The net result is better bonding of the cement to the casing and formation.

20 Claims, 3 Drawing Sheets

METHOD AND DEVICE FOR MANIPULATING FERROFLUIDS FOR USE IN CEMENTING WELLS

CROSS REFERENCE TO RELATED APPLICATIONS

This application is a continuation-in-part of U.S. application Ser. No. 06/798,527, filed 11-15-85, now U.S. Pat. No. 4,691,774 by Nelson, the entire disclosure of which is incorporated herein by reference.

BACKGROUND OF THE INVENTION

1. Field of the Invention

This invention pertains to the manipulation of ferrofluids. More specifically, this invention is related to a magnetic device for the manipulation of ferrofluids in the cementing of oil wells.

2. Technology Review

U.S. Pat. No. 4,356,098 (Chagnon) describes certain stable ferrofluid compositions and a method of making same. Chagnon indicates that ferrofluids are ferromagnetic liquids which typically comprise colloidal dispersion of finely-divided magnetic particles, such as iron, gamma-$Fe_2O_3$ (maghemite), $Fe_3O_4$ (magnetite) and combinations thereof, of subdomain size, such as, for example, 10 to 800 Angstroms, and more particularly 50 to 500 Angstroms, dispersed in a liquid through the use of a surfactant-type material. Chagnon states that typically ferrofluids are remarkably unaffected by the presence of applied magnetic fields or by other force fields in that the magnetic particles remain uniformly dispersed throughout the liquid carrier. Such ferrofluid compositions are widely known, and typical ferrofluid compositions are described, for example, in U.S. Pat. No. 3,764,540 and a process for making such materials is described in U.S. Pat. Nos. 3,917,538 and 4,019,994. Chagnon and the recited references therefore describe ferrofluids in which the only suspended particles are magnetic particles and the liquid medium is generally organic rather than aqueous.

The well cementing technology is replete with references to hydraulic cements and methods of using such cements in cementing wells. In this technology, cement slurries are used to fill the void space between the casing or pipe and the walls of the borehole penetrating a subterranean formation; a process called "well cementing" in the industry. In using such cement slurries, a line or string of pipe is inserted into the borehole and a cement slurry is pumped downwardly through the pipe into the bottom of the borehole and then upwardly along the outside of the casing or pipe displacing drilling mud from the annular space. The cement slurry is then displaced from the interior of the pipe before it hardens; this is normally accomplished by injecting a liquid medium behind the cement slurry and using it as a "hydraulic fluid" to force the remaining cement out of the pipe and into the annulus. In another but less common technique, the borehole is filled with the cement slurry and the pipe or casing (normally with the end sealed) is lowered into the hole. Cementing techniques are more fully described by D. K. Smith in "Cementing", Monograph Vol. IV, Henry L. Doherty Series, Society of Petroleum Engineers of AIME, New York (1976). A problem can occur if the cement slurry does not form a good bond with the casing and the formation wall. If drilling mud is not uniformly and completely displaced from the annulus, a "microannulus" will form around the casing when the slurry fails to bond properly. Various techniques have been used but the most common commercial techniques used to combat this problem involve chemical washes or spacers and/or expansive cements. See, for example, U.S. Pat. No. 4,207,194 (Sharpe et al.) which illustrates the use of chemical washes and spacers. Such chemical washes are injected as a preflush ahead of the cement slurry and are thereby used to displace the drilling mud and "wash" the walls of the formation and casing before being contacted by the cement slurry. See also U.S. Pat. No. 4,328,036 (Nelson et al.) which illustrates the use of expansive cements. Another method utilizes sonic or energy-carrying waves to displace the drilling mud from the walls of the casing and formation. See U.S. Pat. No. 4,093,028 (Brandon). These methods work to a greater or less degree, but a need still exists for a method of removing the drilling mud from the casing and formation walls so as to promote better bonding of the cement slurry thereto. The drilling muds and cement slurries are typically incompatible, particularly when the drilling mud is an oil-base drilling mud.

U.S. Pat. No. 4,691,774 (Nelson) discloses a novel stable cementitious ferrofluid suitable for use in cementing wells, and a process for its use. The present invention provides a device for manipulating cementitious or non-cementitious ferrofluids used in a process for cementing wells.

SUMMARY OF THE INVENTION

A novel device has been discovered which can be used for manipulating cementitious or non-cementitious ferrofluids outside a pipe or casing in a process for cementing wells or preparing a well for cementing. This device comprises:

(a) means for generating at least one magnetic field which extends from the casing into a ferrofluid in the wellbore annulus separating the casing and the walls of a subterranean formation; and (b) means for moving the magnetic field or fields relative to the ferrofluid to cause movement of the ferrofluid.

A novel process for cementing wells has also been discovered which comprises the steps of:

(a) injecting the stable cementitious ferrofluid defined above into the wellbore annulus separating a casing and the walls of a subterranean formation, and (b) applying an alternating magnetic field to cause a mechanical response (e.g., movement) of said ferrofluid in the annulus before the cement sets.

While we do not wish to be bound by any specific theory, it is believed that the mechanical response of the ferrofluid can (a) help hold the cement slurry in place, (b) dislodge and displace any residual drilling fluid on the walls in the casing or formation, (c) "stir" the cement mass in situ in the wellbore and thereby disperse and incorporate residual drilling mud and other contaminates into the cement slurry to form a more homogeneous mass and continuous hydraulic seal, and/or (d) "stir" the cement mass in situ in the wellbore to thereby minimize the static gel strength of the slurry which allows the cement column to continue to exert a hydrostatic pressure against formation fluids and prevent channeling by such fluids; this, in turn, leads to better cement bonding and more effective hydraulic seal.

The magnetic field can be generated by permanent magnetics, electromagnets, or superconducting electromagnets. If the pipe or casing is composed of a ferromagnetic material, such as steel, the pipe or casing itself may be permanently magnetized. Regardless of the casing material, a device containing permanent, electromagnets, or superconducting electromagnets can be lowered into or attached inside or outside the casing to produce the magnetic field. A ferromagnetic casing may require a device generating a relatively stronger field when inside the casing than a nonferromagnetic casing would, due to the magnetic shielding effect of a ferromagnetic casing. Therefore, attaching permanent magnets to the outside of a ferromagnetic casing would be preferred. If the casing consists of a nonferromagnetic substance, such as a composite material, the preferred method would be to lower a magnetic device into the casing, since the device could afterward be recovered by raising it out of the casing.

An array of magnetic fields which extend in a radial direction from the casing is preferred. Motion of the magnetic field relative to the ferrofluid ca be achieved by rotating or axially displacing the device containing permanent magnets, or rotating or axially displacing the casing if the device is attached to the casing; or if the device contains electromagnets, alternating the magnetic fields by electronic means while the device is inside the casing. If the casing itself is magnetized, motion of the magnetic field can be accomplished by rotating or axially displacing the casing. Axial rotation of radially alternating poles efficiently produces motion of the ferrofluid.

Additionally, if the casing is composed of ferromagnetic material, a first magnetic field can be generated in, for example, an axial direction along the casing by winding wire around the casing and applying direct current through the resulting solenoid. Then a second magnetic field at an oblique angle or perpendicular to the first magnetic field, for example in a radial direction through the pipe, can be generated by a permanent magnet, electromagnet, or superconducting electromagnet. The result of this arrangement is that the first magnetic field creates a degree of magnetic saturation of the ferromagnetic casing, thus overcoming the tendency of the casing to shield the second magnetic field from the ferrofluid outside the casing and allowing the second magnetic field to penetrate more deeply into the ferrofluid than would otherwise be possible without the first magnetic field. The magnet or arrangement of magnets or electromagnets generating the second magnetic field can be moved or rotated as described above.

DESCRIPTION OF THE PREFERRED EMBODIMENTS

Figure 3:
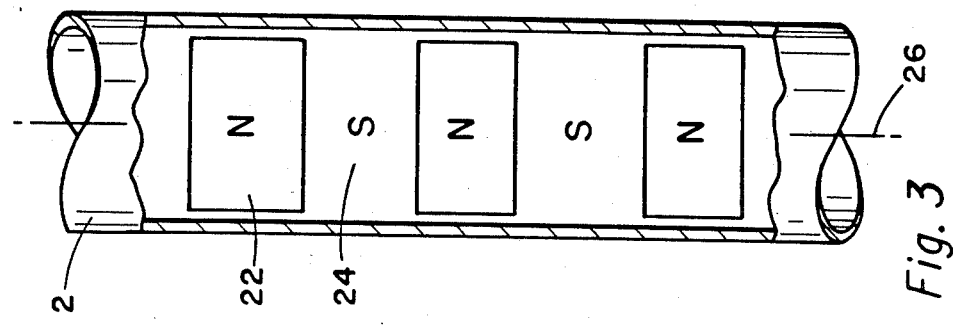
FIG. 3 illustrates another possible arrangement of magnetic fields, and FIG. 4 a ferromagnetic casing with solenoid windings and a magnet inside.

The stable cementitious ferrofluids utilized herein comprise:
(a) a hydraulic cement,
(b) finely divided magnetic particles,
(c) a binding agent or a surfactant, and
(d) a liquid medium.

The hydraulic cements comprise a known class of materials, any member of which can be used herein. However, Portland cements are preferred and the Class A, Class B, Class G and Class H Portland cements (as classified by the American Petroleum Institute (API)) are most preferred because of price and commercial availability. Other hydraulic cements include calcium aluminate cements (e.g., sold as Lumnite or Ciment Fondu), epoxy cements, silicone cements (geothermal cements), and the like.

The finely divide magnetic particles used in the present invention can be selected from the known class of magnetic materials, any member of which can be used so long as the material is essentially chemically inert in the stable ferrofluid composition. Such materials include, for example, magnetite, gamma-$Fe_2O_3$, chromium dioxide, cobalt-treated iron oxides, samarium cobalt alloys, and the like. Of these, magnetite and gamma-$Fe_2O_3$ are preferred based upon cost and commercial availability. The particle size of the magnetic particle can be varied to convenience so long as the formulated ferrofluid is stable (i.e., the magnetic particles remain uniformly suspended throughout the ferrofluid composition under conditions of use in well cementing and in the presence of a magnetic field). Magnetic materials with particle sizes of up to about 4000 Angstroms are presently preferred, based on commercial availability of such materials. Larger particle sizes and mixtures of particle sizes can also be used. The amount of magnetic material included in the ferrofluids can be varied, but generally amount of up to about 20 weight percent are used, total weight basis.

A binding agent or surfactant is also used in the stable ferrofluid composition. The binding agent is preferably a synthetic polymer latex, and a styrene-butadiene polymer latex is most preferred. If a surfactant is chosen, any surfactant may be used which will keep the magnetic particles uniformly suspended in the cementitious ferrofluid composition and which does not adversely react with the hydraulic cement component. Normally, a non-ionic or anionic surfactant is used. Examples of such surfactants include: sulfonated aromatic polymers (e.g., naphthalene sulfonates, sulfonated polystyrenes, sulfonated polyvinyltoluenes, lignosulfonates, etc.); polyamines (e.g., polyalkylenepolyamines, etc.), polyvinylalcohols, and the like. The polymeric latex binding agents are presently preferred over the surfactants in formulating the cementitious ferrofluids Additives conventionally used in well cements can also be included in the present cementitious ferrofluids in conventional amounts so long as such additives do not affect the stability and performance of the cement slurry.

The liquid medium in the cementitious ferrofluids is normally an aqueous liquid. When Portland cement is utilized, water or water-alcohol solution are used and water is the preferred medium. The lower alkanols (e.g., methanol, ethanol, isopropanol, etc.) are occasionally used to enhance the solubility of organic additives in the cement slurry.

As noted above, conventional oilfield cement additives can be used herein. Such additives include: for example, fluid-loss additives, retarders, accelerators, extenders, lost circulation materials, weighting agents, gases, expansive agents, dispersants, surfactants, and the like, all of which are known classes of materials.

The cementitious ferrofluids are formulated by blending the components in appropriate amounts in any convenient manner. Normally, the magnetic particles are blended with the dry hydraulic cement and the dry blend is then added to the liquid medium containing the binding agent or surfactant with stirring or other mechanical means of agitation. If other additives are used, they are added to the cement slurry via conventional techniques. In well cementing, the cementitious ferrofluid will normally be prepared at the well site using conventional blending equipment to blend the solids and liquids together.

The spacer or chemical wash ferrofluids which are used herein are prepared by blending the magnetic particles, a stabilizing agent (binding agent or surfactant) and the spacer or chemical wash formation.

The cementitious ferrofluid can be injected into the annulus by any convenient technique, but most commonly the cementitious fluid will be pumped through the piping or casing to the bottom of the wellbore and then upwardly through the annulus separating the casing and the walls of the formation until the desired zone has been filled with cement slurry.

Alternatively, the spacer or chemical wash ferrofluid is injected through the casing to the bottom of the wellbore and upwardly through the annulus separating the casing and the walls of the formation to the zone to be treated, and the spacer or chemical wash ferrofluid is thereafter displaced by a conventional well cement or by the cementitious ferrofluid of the present invention.

In each instance, an alternating magnetic field is applied to the spacer or chemical wash ferrofluid and/or the cementitious ferrofluid while it is in the zone to be cemented. The magnetic field applied may be a continuous or intermittent magnetic field strong enough to cause a mechanical response (e.g., movement) from the ferrofluid in situ. The response of the ferrofluid will thereby dislodge and displace residual drilling mud on the walls of the casing and/or the formation. Cement bonding to the casing and formation is thereby enhanced.

Experimental

All of the experimental slurries described below were prepared according to cement slurry preparation procedures recommended by the API in API Spec 10, "API Specification for Materials and Testing for Well Cementing Second Edition, Section 5, pp. 16–17.

1. Class H Portland Cement (500 g), Dow Magnetic Latex #181 (magnetization: 130 gauss; 90 mL) and fresh water (110 mL) were blended together to form a homogeneous cement slurry. Upon placing a bar magnet made of samarium cobalt next to the glass beaker containing the slurry, the slurry moved as a unit toward the magnet. Upon continuous exposure to the magnetic field, no segration of the magnetic latex from the cement matrix occurred. Therefore, the slurry is a stable cementitious ferrofluid which can be used in cementing wells, per the present invention.

2 Class H Portland Cement (400 g), gamma-$Fe_2O_3$ Pfizer No. MO-2228; 40 g), polynapthalene sulfonate formaldehyde condensate (Dowell Schlumberger D65; 4 g), styrene-butadiene latex (Dowell Schlumberger D600; 20 mL), and fresh water (300 mL) were blended together to form a homogeneous cement slurry. Upon placing a samarium cobalt bar magnet next to the glass beaker containing the slurry, the slurry moved as a unit toward the magnet. Upon continuous exposure to the magnetic field, the gamma-$Fe_2O_3$ particles did not separate from the cement matrix. This system is also a stable cementitious ferrofluid useful in the present invention.

3. Class H Portland Cement (400 g), $CaSO_4\frac{1}{2} H_2O$ (40 g), silica flour (140 g), polynapthalene sulfonate - formaldehyde condensate (Dowell Schlumberger D65; 2 g), styrenebutadience latex (Dowell Schlumberger D600; 8 mL), and water (309 mL) were blended together to form a homogeneous cement slurry. Upon placing a samarium cobalt bar magnet next to the glass beaker containing the slurry, the slurry moved as a unit toward the magnet. Upon continuous exposure to the magnetic field, the gamma-$Fe_2O_3$ particles did not separate from the cement matrix. This system is also a stable cementitious ferrofluid useful in the present invention. Note that this cement system is an "expanding cement" which expands after setting.

The following "washes" or "spacer fluids" are non-cementitious ferrofluids, in a well cementing context. The API slurry preparation procedure applies for these fluids.

4. A commercial silicate-gel spacer concentrate (Spacer 1000 from Dowell Schlumberger; 64 g) was blended with gamma-$Fe_2O_3$ (61 g), and diluted with water (475 mL) to form an aqueous slurry. Upon placing a samarium cobalt bar magnet next to the glass beaker containing the slurry, the slurry moved as a unit toward the magnet. Upon continuous exposure to the magnetic field, the gamma-$Fe_2O_3$ particles did not separate from the matrix. This system is a stable ferrofluid and can be used as a spacer or wash in cementing wells.

5. A commercial cellulose-gel spacer concentrate (Spacer 3000 from Dowell Schlumberger; 50 g) was blended with barite (76 g), gamma-$Fe_2O_3$ (50 g), styrene-butadiene latex (Dowell Schlumberger D600; 4 mL) and 380 mL water to form a slurry. Upon placing a samarium cobalt bar magnet next to the glass beaker containing the slurry, the slurry will move as a unit toward the magnet. Upon continuous exposure to the magnetic field, the gamma-$Fe_2O_3$ particles did not separate from the matrix. This system is a stable ferrofluid and can be used as a spacer or wash in cementing wells.

The following is an illustration of one embodiment of the invention.

6. A cementitious ferrofluid with the composition given in Example 2 was placed in the annulus of a laboratory-scale wellbore model. A magnetic device, with samarium/cobalt magnets arranged radially, was placed inside the model's casing. Upon rotation of the magnetic device inside the casing, the cementitious ferrofluid was observed to spin around the casing.

Figure 2:
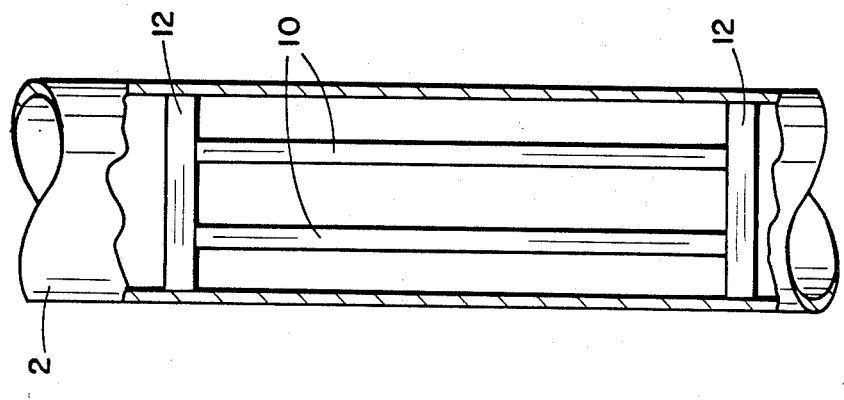
Figure 1:
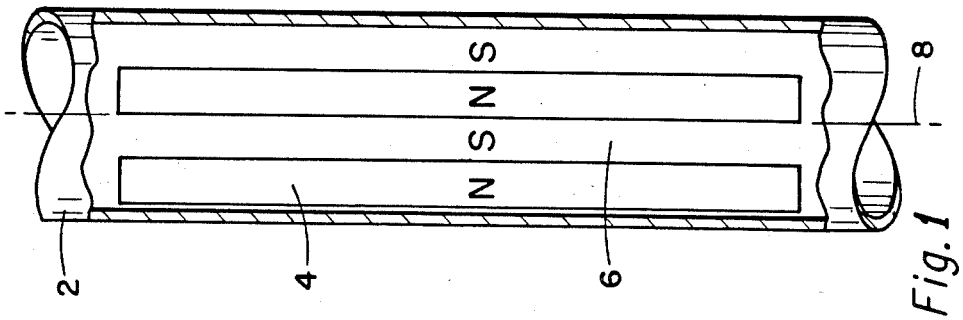
FIG. 1 is a drawing of a section of pipe or casing showing the magnetic fields. A section of casing with magnets is shown in FIG. 2.

One embodiment of the invention is shown in FIG. 1, in which a casing 2 is provided with magnetic fields having north and south poles 4 and 6, respectively. The magnetic fields could be generated as shown in FIG. 2, or the casing itself could be magnetized, or the fields could be generated by an axially displaceable device containing permanent magnets or electromagnets. The magnetic fields are then caused to move around axis 8, for example by rotating the casing if the casing is magnetized, or by rotating a device containing permanent magnets or electromagnets, or, in the case of electromagnets, by electronic means. In FIG. 2, magnets 10 are attached on the outside of casing 2 by straps 12. Other ways of attaching the magnets to the casing, such as by welding or glue, are also suitable.

FIG. 3 shows a casing 2 provided with magnetic fields consisting of north and south poles 22 and 24, respectively, in an alternative configuration. Movement of a ferrofluid outside the casing is caused by moving the magnetic fields up and down axis 26, in ways analogous to those discussed for FIG. 2.

Figure 4:
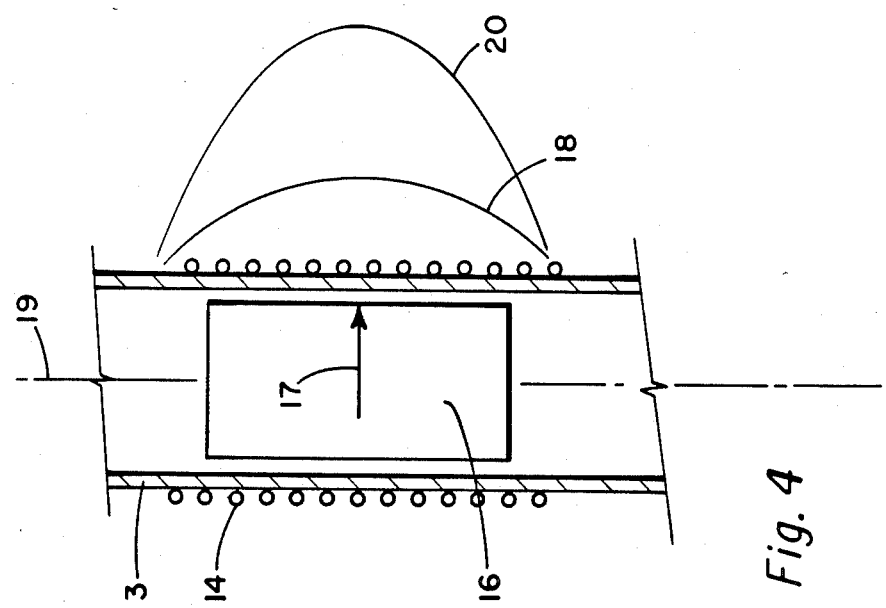

FIG. 4 is a cut-away view of a ferromagnetic casing 3 furnished with solenoid windings 14 and a magnet 16 inside magnetized in the direction shown by arrow 17. Flux line 18 of magnet 16 shows the shielding effect of the ferromagnetic casing when no current is supplied to the solenoid, compared to the enhanced flux line 20 illustrating the increased amount of flux manifested by magnet 16 when current is supplied to the solenoid. The magnetic field represented by flux lines 18 or 20 can be rotated with respect to a ferrofluid surrounding the casing by rotating magnet 16 around the axis 19.

Figure 5:
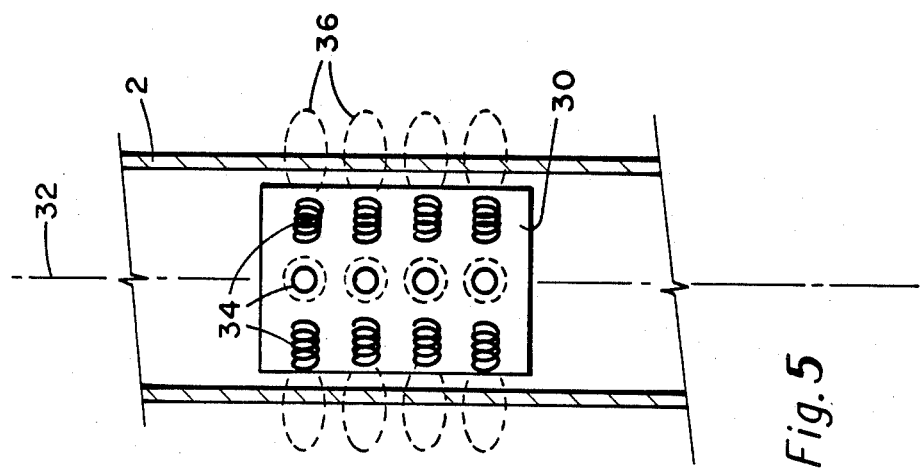
FIG. 5 is of an electromagnetic device which can be lowered into and raised out of the casing.

FIG. 5 shows an electromagnetic device 30 in a casing 2. The device can be moved vertically along the suspending means 32. Coils 34 produce magnetic fields 36 which can be moved with respect to a ferrofluid outside the casing by moving the device along the vertical axis of the casing, and/or by electronic means resulting in changing the polarity of the coils.

What is claimed is:

1. A device for manipulating ferrofluids in a wellbore annulus between a pipe or casing and walls of a well, comprising:
   (a) means for generating a plurality of alternating magnetic fields distributed in a radial manner, said fields extending into a ferrofluid in the wellbore annulus separating the casing and walls of a subterranean formation; and
   (b) means for moving said plurality of magnetic fields relative to the ferrofluid, to facilitate movement of the ferrofluid.

2. A device for manipulating ferrofluids in a wellbore annulus between a pipe or casing and walls of a well, comprising:
   (a) a permanently magnetized casing for generating at least one magnetic field, said field extending into a ferrofluid in the wellbore annulus separating the casing and walls of a subterranean formation; and
   (b) means for moving said casing relative to the ferrofluid, to facilitate movement of the ferrofluid.

3. A device as defined by claim 2, in which a plurality of magnetic fields are alternatingly distributed in a radial manner around the casing.

4. A device as defined by claim 2, in which a plurality of magnetic fields are alternatingly distributed in an axial manner along the casing.

5. A device as defined by claim 1 in which the magnetic field generating means comprises an array of permanent magnets and the magnetic field moving means comprises means to move said array with respect to the ferrofluid.

6. A device as defined by claim 5 in which the north and south poles of the array of permanent magnets are alternatingly distributed in a radial manner around the casing.

7. A device as defined by claim 5 in which the north and south poles of the array of permanent magnets are alternatingly distributed in an axial manner along the casing.

8. A device for manipulating ferrofluids in a wellbore annulus between a ferromagnetic casing and walls of a well, comprising:
   (a) means for generating a first magnetic field in a first direction in the ferromagnetic casing;
   (b) means for generating a second magnetic field in a second direction forming a non-zero angle with said first magnetic field, said second magnetic field extending into a ferrofluid in the wellbore annulus separating the casing and walls of a subterranean formation; and
   (c) means for moving said second magnetic field relative to the ferrofluid, to facilitate movement of the ferrofluid.

9. A device as defined by claim 8, in which the first magnetic field generating means comprises a solenoid.

10. A method for manipulating ferrofluids in a wellbore annulus between a pipe or casing and walls of a well, comprising the steps of:
    (a) generating a plurality of alternating magnetic fields distributed in a radial manner and extending into a ferrofluid in the wellbore annulus separating the casing and walls of a subterranean formation; and
    (b) moving said plurality of magnetic fields relative to the ferrofluid, to facilitate movement of the ferrofluid.

11. A method for manipulating ferrofluids in a wellbore annulus between a pipe or casing and walls of a well, comprising the steps of:
    (a) generating at least one magnetic field by a permanently magnetized casing, said magnetic field extending into a ferrofluid in the wellbore annulus separating the casing and walls of a subterranean formation; and
    (b) moving said casing relative to the ferrofluid, to facilitate movement of the ferrofluid.

12. A method as defined by claim 11, in which a plurality of magnetic fields are alternatingly distributed in a radial manner around the casing.

13. A method as defined by claim 11, in which a plurality of magnetic fields are alternatingly distributed in an axial manner along the casing.

14. A method as defined by claim 10 in which the magnetic field generating step is performed by an array of permanent magnets and the magnetic field moving step is performed by moving said array with respect to the ferrofluid.

15. A method as defined by claim 14 in which, in the magnetic field generating step, the north and south poles of the permanent magnets are alternatingly distributed in a radial manner around the casing, and in the magnetic field moving step the array is rotated around an axis coincident with the axis of the casing.

16. A method as defined by claim 14 in which, in the magnetic field generating step, the north and south poles of the array of permanent magnets are alternatingly distributed in an axial manner along the casing, and in the magnetic field moving step the array is axially displaced along an axis coincident with the axis of the casing.

17. A method for manipulating ferrofluids in a wellbore annulus between a ferromagnetic casing and walls of a well, comprising the steps of:
    (a) generating a first magnetic field in a first direction in the ferromagnetic casing;
    (b) generating a second magnetic field in a second direction forming a non-zero angle with said first magnetic field, said second magnetic field extending into a ferrofluid in the wellbore annulus separating the casing and walls of a subterranean formation; and
    (c) moving said second magnetic field relative to the ferrofluid, to facillitate movement of the ferrofluid.

18. A method as defined by claim 17, in which in the first magnetic field generating step, the first magnetic field is generated by a solenoid

19. A device as defined by claim 6 in which the permanent magnets are attached to the outside of the casing and the magnetic field moving means comprises means to rotate the casing around an axis coincident with the axis of the casing.

20. A method as defined by claim 15, in which the permanent magnets are attached to the outside of the casing.

* * * * *